United States Patent [19]

Clemens et al.

[11] Patent Number: 4,842,629
[45] Date of Patent: Jun. 27, 1989

[54] METHOD FOR PRODUCING BURIED REGIONS OF RAISED REFRACTIVE INDEX IN A GLASS MEMBER BY ION EXCHANGE

[75] Inventors: Peter Clemens; Herbert Michel, both of Munich; Christoph Thoma, Vaterstetten, all of Fed. Rep. of Germany

[73] Assignee: Siemens Aktiengesellschaft, Berlin and Munich, Fed. Rep. of Germany

[21] Appl. No.: 119,563

[22] Filed: Nov. 12, 1987

[30] Foreign Application Priority Data

Dec. 1, 1986 [DE] Fed. Rep. of Germany ....... 3641018

[51] Int. Cl.$^4$ ............................................. C03C 21/00
[52] U.S. Cl. ...................................... 65/30.13; 65/31; 156/655; 156/663
[58] Field of Search ........................ 65/17, 30.1, 30.11, 65/30.13, 31, 60.1, 60.51, 61, 3.14; 156/663, 655, 657

[56] References Cited

U.S. PATENT DOCUMENTS

| 4,084,023 | 4/1978 | Dafter, Jr. .......................... 427/306 |
| 4,302,231 | 11/1981 | Macedo et al. ......................... 65/31 |
| 4,554,050 | 11/1985 | Minford et al. ...................... 156/664 |

FOREIGN PATENT DOCUMENTS

| 2912563 | 10/1980 | Fed. Rep. of Germany .......... 65/31 |
| 61-6154 | 1/1986 | Japan .................................. 65/30.13 |

OTHER PUBLICATIONS

Okuda et al, "Planar Gradient-Index Glass Waveguide and Its Applications to a 4-Port Branched Circuit and Star Coupler", *Applied Optics*, vol. 23, No. 11, Jun. 1984, pp. 1745-1748.

Murphy et al, "Integrated Optics Processing: Uses of an EDTA ETCH Solution", *Electronics Letters*, vol. 20, No. 19, 13 Sep. 1984, pp. 760-761.

Lilienhof et al, "Printed Geodesic Lenses in Glass with Ion-Exchanged Film Waveguides", Electronic Letters, vol. 18, No. 8, 15th Apr., 1982, pp. 344-345.

*Primary Examiner*—Kenneth M. Schor

[57] ABSTRACT

An improvement for a method of producing buried regions of raised refractive index in a glass member by ion exchange characterized by removing a titanium mask from the glass member after a first ion exchange to raise the refractive index of exposed portions of the glass member with an EDTA disodium etching solution followed by a slight material erosion of the glass after removal of the titanium mask prior to an implementation of a second field-assisted ion exchange.

8 Claims, 1 Drawing Sheet

METHOD FOR PRODUCING BURIED REGIONS OF RAISED REFRACTIVE INDEX IN A GLASS MEMBER BY ION EXCHANGE

BACKGROUND OF THE INVENTION

The present invention is directed to a method for manufacturing a buried region of increased refractive index in a glass member by an ion exchange. The method comprises the steps of providing a mask of titanium on a surface of a glass member or substrate, raising the refractive index of exposed portions of the glass surface by penetrating the exposed surface with an iontype raising the refractive index of the glass, then removing the titanium mask and then burying the raised refractive index portions in the glass member or substrate by conducting a second ion exchange with another type of ion, which will not raise the refractive index but causes an inward migration of the ions that raise the refractive index.

It is known to raise the refractive index of glass in a method wherein $Cs^+$ ions from a $CsNO_3/KNO_3$ melt in a first fieldpromoted ion exchange are used. Thus, the $Cs^+$ ions penetrate into the glass only where the region of raised refractive index, for example, a strip waveguide or a structure composed of such waveguides, is to occur. To control this, a mask of titanium is employed, and the titanium will block the penetration of the $Cs^+$ ions into the glass on those portions of the surface covered by the titanium mask. The regions of raised refractive index will be produced in those regions not covered by the layer of titanium material or, in other words, the spaces between the layers or portions of titanium material. A similar method is known from an article in *Appl. Optics* Vol. 23, No. 11 (1984), pp. 1745.

An additional field-assisted ion exchange for burying the region is then undertaken. For example, the additional ion exchange uses a salt melt which contains an alkali ion of the glass, generally $Na^+$ or/and $K^+$ ions. In this exchange, the region of raised refractive index produced by the first ion exchange will migrate into the interior of the glass member and is, thus, buried.

Problems occur in the removal of the roughly 200–500 nm thick mask of titanium from the surface of the glass member or substrate. One problem is to find an etchant, which will etch the titanium away without damaging the glass surface or damaging the region of the raised refractive index, for example, the strip waveguide or the strip waveguide structure.

Due to chemical reactions in the hot salt melt, the mask of the titanium is significantly more resistant to a hydrofluoric acid than in the case of a fresh layer of titanium. A mechanical erosion, for example by grinding of the titanium, is also a problem, because the glass member may have warped due to the treatment with the hot salt melt, and an adequately planar surface generally no longer exists. Therefore, problems occur with being able to grind or polish the mask away without damaging or destroying the region of the raised refractive index.

SUMMARY OF THE INVENTION

The object of the present invention is to provide a method for raising the refractive index of a glass substrate to form waveguides or waveguide structures in which a titanium mask can be removed without problems and can be removed without risk to the region of the raised refractive index.

This object is achieved by an improvement in a process or method for producing a buried region of raised refractive index in a glass member by ion exchange, said method comprising providing a glass member having a mask of a layer of titanium with portions of the surface free of the layer of titanium, raising the refractive index of the exposed portions of the surface of the glass member with a first field-assisted ion exchange having an ion type for raising the refractive index of the glass coming from the salt melt contacting the glass member, subsequently removing the mask by etching the titanium away and then treating the regions of raised refractive index by a second field-assisted ion exchange at the surface of the glass member, which contains the regions of raised refractive index, said second field-assisted ion exchange utilizing another type of ion which does not raise the refractive index of the glass to cause migration of the raised refractive index into the interior of the glass member. The improvements are that the titanium, which is exposed to the hot salt melt during the first ion exchange is etched away with an EDTA disodium etching solution, and this etching step is followed by a slight material erosion, which does not substantially deteriorate the region of the raised refractive index on the glass surface, which is now free of the titanium before the step of the second field-assisted ion exchange.

This solution is based on a new perception that the titanium can, in fact, be etched off by an EDTA etching solution without damage to the glass surface, but that, subsequently, the glass surface freed of the titanium acts like an ion barrier, which will prevent the penetration of the ions into the glass during the second ion exchange process, and that the ion blocking effect can be eliminated by a slight material erosion of this surface which does not deteriorate the region of the raised refractive index.

An EDTA disodium solution, which has proven itself, is a solution which contains 200 ml of $H_2O$, and at least 0.1 g of ethylene dinitrilo tetraacetic acid disodium salt, which is sold by the Merck Company under the Trademark "TITRIPLEX III". Another EDTA disodium etching solution is one which includes, in addition to the Titriplex III, contains either $NH_3$ or $H_2O_2$ and $NH_3$. For example, an etching solution which is composed of 0.1 g–25 g of the Titriplex III, 0 g–80 g of $H_2O_2$ and 0 g–80 g of $NH_3$, with 200 ml of $H_2O$ is preferably employed.

It should be pointed out that the employment of EDTA disodium etching solutions for gently etching a titanium layer is already known from *Electron. Lett.*, Vol. 20, No. 19 (1984), pp. 760. The titanium layer therein, however, is not situated on glass but on a $LiNbO_3$, and the method described therein does not relate to an ion exchange process.

The slight material erosion is preferably generated by polishing, however, it can also be produced by etching.

Other objects and advantages of the present invention will be readily apparent from the following exemplary embodiment of the invention, which is set forth in the following description with reference to the Figures and claims.

DESCRIPTION OF THE PREFERRED EMBODIMENTS

The principles of the present invention are particularly useful for producing a glass member 3 (FIG. 5), which has buried strip waveguides 33 and 34.

Figure 5:
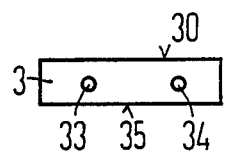
FIG. 5 is an end view of the glass member having the two buried strip waveguides produced by the method of the present invention.

In the first step of the method of producing, the glass member 3 with the buried strip waveguides 33 and 34 of FIG. 5, comprises providing a vessel 1 (FIG. 1) for a $CsNO_3/KNO_3$ melt and a tube 2 for a $KNO_3$ melt, on whose lower end a glass member or substrate 3' is held by suction. The two buried strip waveguides are to be produced in this glass member 3'. Such an apparatus is known, for example, from an article in *Electron. Lett.*, Vol. 18, No. 8 (1982) pp. 344. The $KNO_3$ melt cathodically contacts the member or substrate 3' on an upper surface 30, whereas the underside or bottom surface 35 is anodically contacted by the $CsNO_3/KNO_3$ melt. A mask of titanium has been applied to the under surface 35, and this will block the penetration of the Cs+ ions into the glass, except in the strip areas 41 and 42, which are free of the titanium layer 4, to expose portions of the surface 35.

During the field-assisted ion exchange carried out at about 400° C., the Cs+ ions penetrate into the glass in the region of the strips 41 and 42 and raise the refractive index of the glass in this region so that the strip waveguides 31 and 32 arise at the surface of the underside 35 to produce a processed glass member 3''.

Figure 1:
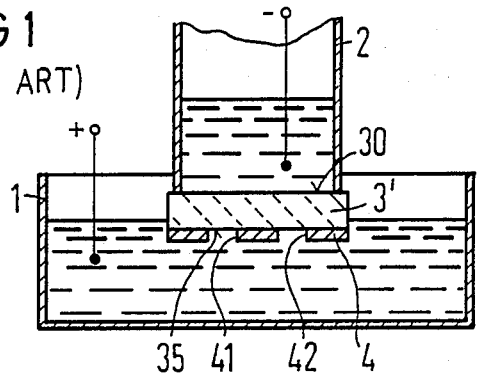
FIG. 1 is a cross sectional view through a traditional apparatus for the implementation of the first ion exchange.
Figure 2:
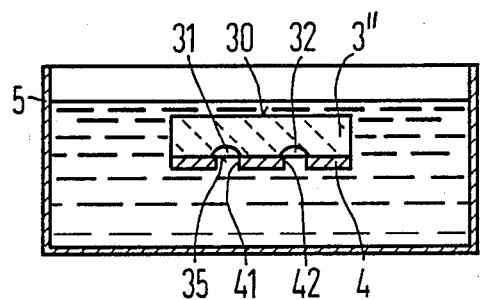
FIG. 2 is a cross sectional view through an apparatus for the implementation of the etching step for removing the titanium in accordance with the present invention.

The glass member 3'', which has the strip waveguides 31 and 32 and the mask 4 of titanium, is then removed from the apparatus 1 of FIG. 1. After removal, the member 3'' is placed in an EDTA disodium etching solution in a vessel 5 (FIG. 2), in which the titanium layer of the mask 4 is etched away without deterioration of the glass surface. EDTA disodium stands for ethylene dinitrilo tetraacetic acid disodium salt (Dihydrate), which has a chemical formula of $C_{10}H_{14}N_2Na_2O_8 \cdot 2H_2O$.

The EDTA disodium can, for example, have the following composition 5 g Titriplex III; 200 ml $H_2O$; 20 ml 30% $H_2O_2$ solution; and 20 ml 25% $NH_3$ solution. As noted hereinabove, Titriplex III is a trademark for the ethylene dinitrilo tetraacetic acid disodium salt (Dihydrate), which has a formula of $C_{10}H_{14}N_2Na_2O_8 \cdot H_2O$.

Figure 3:
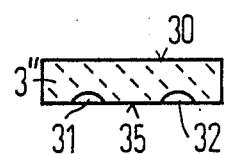
FIG. 3 is a cross sectional view of a glass member containing two strip waveguides on the surface of the member obtained after the etching step in the apparatus of FIG. 2.
Figure 4:
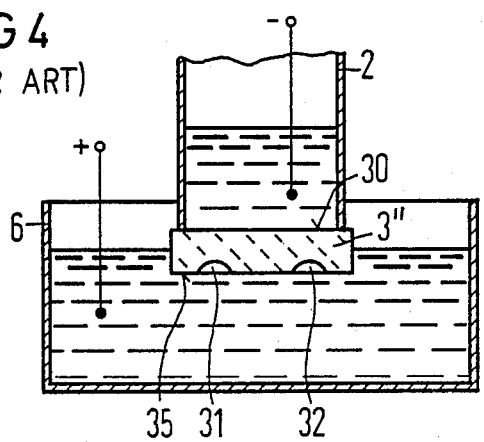
FIG. 4 is a cross sectional view through a traditional apparatus for the implementation of the second ion exchange.

After the titanium has been etched off, the glass member 3'' (shown in FIG. 3) will have two strip waveguides 31 and 32 on the undersurface 35. The undersurface 35, which is freed of the titanium, i.e., the region of the undersurface 35 that was covered by the titanium acts as an ion barrier so that a second ion exchange including the whole surface cannot be carried out. When etching the titanium off, a thin ion-blocking layer may remain. This layer, however, can be polished off without problems and without deteriorating the strip waveguides 31 and 32. An etching treatment is also suitable to remove the layer and it can be either a wet-etching or a dry-etching method. Care must merely be exercised to see that the etching process is selected to be so short that the strip waveguides 31 and 32 are not deteriorated, but long enough so that the blocking effect of the underside or surface 35 has been eliminated. As in the case of polishing, this can be easily determined with a few trials.

The second ion exchange is undertaken on the polished member for burying the strip waveguides 31 and 32. An apparatus similar to the apparatus of FIG. 1 is provided for this purpose and this differs from that apparatus only in that the vessel 6 of the second ion exchange process has a $KNO_3$ melt instead of the melt of $CsNO_3/KNO_3$. The vessel 6 is anodically contacting the underside 35, which has the waveguides 31 and 32 of the glass member 3''. After the implementation of this ion exchange at a temperature of about 400°C., the strip waveguides 31 and 32 will have migrated from the polished under surface 35 in an upward direction into the interior of the glass member so that the final glass member 3, which has the buried strip waveguides 33 and 34, shown in FIG. 5, will be obtained.

Although various minor modifications may be suggested by those versed in the art, it should be understood that we wish to embody within the scope of the patent granted hereon all such modifications as reasonably and properly come within the scope of our contribution to the art.

We claim:

1. In a method for producing a buried region of a raised refractive index in a glass member by ion exchange process, said method comprising providing a glass member having one surface provided with a mask of a titanium coating to block the penetration of the ions from a salt melt of refractive-index-raising ions into the glass and said one surface of said glass member having surface areas free of the titanium coating, conducting a first field-assisted ion exchange having an ion for raising the refractive index of the glass coming from a salt melt contacting the exposed surfaces of the glass through the mask to thereby raise the refractive index of the glass immediately beneath the exposed surface portions and thus provide regions of raised refrative index immediately beneath the exposed surface portions, then etching away the titanium coating with an etching solution and then burying the regions of raised refractive index by a second field-assisted ion exchange with another ion contacting the surface of the glass member containing the regions of raised refractive index, said another ion having a neutral effect with regard to the refractive index of the glass, the improvements comprising the step of etching away the titanium coating which has been exposed to a hot salt melt of the first ion exchange being etched away with an ethylene dinitrilo tetraacetic acid (EDTA) disodium etching solution, and then removing any ion barrier on the surface free of the titanium coating by creating a slight material erosion of the surface freed of the titanium coating without deteriorating the regions of the raised refractive index at the surface prior to implementing the second field-assisted ion exchange step.

2. In a method according to claim 1, wherein the etching solution contains 200 ml of H$_2$O and at least 0.1 g of EDTA disodium which has a chemical formula of C$_{10}$H$_{14}$N$_2$Na$_2$O$_8$.2H$_2$O.

3. In a method according to claim 2, wherein the etching solution which also contains additions of H$_2$O$_2$ and NH$_3$.

4. In a method according to claim 2, wherein the etching solution also includes an addition of NH$_3$.

5. In a method according to claim 1, wherein the etching solution is composed of 200 ml H$_2$O, 0.1 g–25 g of EDTA disodium, 0 g–80 g H$_2$O$_2$ and 0 g–80 g NH$_3$.

6. In a method according to claim 1, wherein the step of slight material erosion comprises polishing the surface of the glass member which is freed of the titanium coating.

7. In a method according to claim 1, wherein the step of slight material erosion is produced by briefly etching the surface of the glass freed of the titanium coating.

8. In a method according to claim 1, wherein the step of slight material erosion is produced by dry-etching the surface of the glass freed of the titanium coating.

* * * * *